United States Patent [19]

Winchell

[11] 4,087,107
[45] May 2, 1978

[54] CAMBERING VEHICLE WITH TRAILING ARM SEAT FOR VEHICLE OPERATOR

[75] Inventor: Frank J. Winchell, Orchard Lake, Mich.

[73] Assignee: General Motors Corporation, Detroit, Mich.

[21] Appl. No.: 714,902

[22] Filed: Aug. 16, 1976

[51] Int. Cl.² .................... B62K 5/00; B62M 1/00
[52] U.S. Cl. .................... 280/220; 180/25 A; 180/26 R; 280/210
[58] Field of Search ............... 280/87 R, 87 B, 112 R, 280/112 A, 278, 287, 6 R, 6 H, 6.1, 6.11, 200, 210, 218, 220, 221, 224, 21 R, 21 A, 12.1, 12 H, 282, 87.04 R, 87.04 A, 283, 16; 180/25 R, 25 A, 26 R, 41

[56] References Cited

U.S. PATENT DOCUMENTS

| 2,593,974 | 4/1952 | Brown | 280/21 |
| 3,014,731 | 12/1961 | Dworak | 280/16 |
| 3,236,323 | 2/1966 | Austin | 280/293 |
| 3,480,289 | 11/1969 | Larkin | 280/21 R |
| 3,656,775 | 4/1972 | Krautter | 280/16 |
| 3,799,565 | 3/1974 | Burtis | 280/16 |

FOREIGN PATENT DOCUMENTS 178,275 9/1953 Austria .................... 280/16

Primary Examiner—Joseph F. Peters, Jr.
Assistant Examiner—Terrance L. Siemens
Attorney, Agent, or Firm—Charles R. White

[57] ABSTRACT

This cambering vehicle incorporates a frame having a steerable front contact engaging a support surface and having three laterally spaced trailing arms pivoted at their forward ends to the frame and with separate rear contacts engaging the support surface. The intermediate trailing arm supports a seat on which the operator may sit while operating the vehicle. Foot rests are secured to the outboard trailing arms allowing the operator to stand on the vehicle and camber steer the vehicle into turns with manual forces applied to the rear surface contact through a shift in weight of the operator through the foot rests. An optional trailer is provided for the vehicle to increase load capacity.

4 Claims, 7 Drawing Figures

CAMBERING VEHICLE WITH TRAILING ARM SEAT FOR VEHICLE OPERATOR

This invention relates to narrow track vehicles and more particularly to a new and improved cambering vehicle having seating provision allowing the operator to effectively operate and control the vehicle while seated but which permits the operator to stand up on trailing arms of the vehicle and selectively shift his weight by leaning to one side or the other for cambering operations.

Prior to the present invention a number of cambering vehicles have been designed or proposed as light weight personalized narrow track vehicles to provide a highly maneuverable vehicle for recreational and transportation uses. Generally these vehicles do not permit the operator to maximize the use of his body and body weight in leaning and shifting weight from one foot to the other to camber steer the vehicle through a wide range of turns at varying vehicle speeds. While seating is provided on prior cambering vehicles, the construction of such vehicles prohibits the effective use of input into the vehicle through the feet. Furthermore, the prior art seat construction for cambering vehicles is attached to framework which is secured to the main frame of the vehicle and cannot be readily removed to increase vehicle versatility and to reduce vehicle weight.

In contrast to the prior art, the present invention provides adequate seating for the operator and allows the operator to drive the vehicle effectively and efficiently while seated and further permits the operator to stand in a natural manner on side by side trailing arms, mounting rear ground contact means, allowing selective weight shifts and manual input directly to the trailing arms for vehicle operation such as maximized camber steered turns over a wide range of vehicle speeds.

In a preferred embodiment of this invention a third trailing arm is interconnected to the main frame of the vehicle between a pair of trailing arms on which rear wheels or other ground contact means are disposed. The third trailing arm carries a wheel or other ground contact that supports a seat so that the operator can rest on the vehicle while he is operating the vehicle. The steering means, supported by the main frame, can be grasped by the operator and the front ground contact wheel or equivalent is guided readily through sharp turns or narrow vehicle pathways at a wide range of speeds. The intermediate trailing arm, as the left and right side trailing arm, is articulated on the main frame so that its up and down movement is independent of the forward ground contact to provide a smoother operation.

It is a feature, object and advantage of this invention to provide a new and improved narrow track cambering vehicle having a steerable front ground contact and having a pair of trailing arms with rear ground contacts swingable in separate planes on opposite sides of a central plane through the vehicle. The operator may stand on the trailing arms so he can shift his body weight between the trailing arms for improved vehicle cambering operations resulting in increased controllability and maneuverability. This invention features an intermediate trailing arm pivoted to the main frame with a ground contact aligned with the rear contacts on the other trailing arms. A seat supported by the intermediate trailing arm above its ground contact allows the operator to operate the vehicle while resting on the seat. This reduces operator fatigue and therefore extends the usability of the cambering vehicle. In a modification a trailer with a ground contact can be attached to the end of the intermediate trailing arm to materially increase load capacity of the vehicle. In operation the trailer cambers in the same manner as the intermediate trailing arm so that the maneuverability is maintained. The intermediate trailing arm and the trailer can be readily removed to prepare the vehicle for full time stand-up operation.

These and other features, objects and advantages of this invention will become more apparent from the following detailed description and drawing in which.

Figure 1:
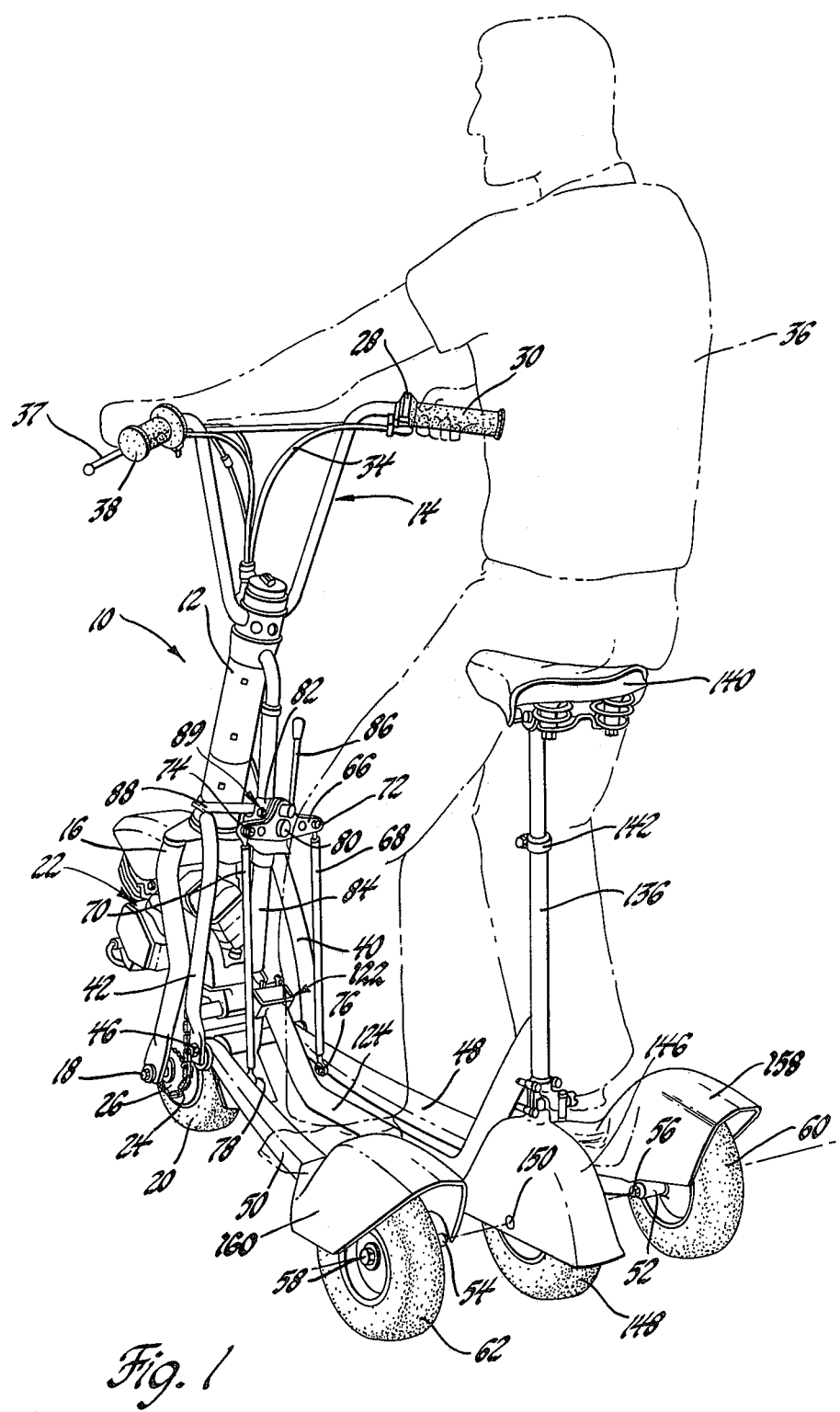
FIG. 1 is a perspective view of a preferred embodiment of this invention.

Turning now in greater detail to the drawing, there is shown in FIG. 1 a cambering vehicle 10 having a front frame comprising a tubular column 12 in which there is rotatably supported a steering shaft not illustrated. The steering shaft is secured at its upper end to a handle bar assembly 14 and at its lower end to a fork 16 that carries an axle 18 which rotatably supports a front drive wheel 20. A suitable power plant, such as internal combustion engine 22 is supported by the fork and drives a chain 24 which in turn is drivingly connected to the front drive wheel 20 through a front wheel sprocket 26. The engine incorporates a conventional centrifugal clutch that drivingly engages at predetermined engine speed above idle for vehicle drive and disengages at idle speed so that there is no power flow to the drive wheel under idling conditions. If desired, the front wheel may be driven by a conventional motorcycle transmission or by an electric drive motor.

Engine speed is controlled by a throttle control 28 formed at the inboard end of rotatable right hand grip 30. This throttle control is connected to the engine throttle by a cable 34 and is manually adjusted by the operator 36 to set the engine at selected throttle openings from idle to wide open throttle. Lever 37 mounted on the handle bar assembly adjacent the left hand grip 38 is operatively connected to the engine and is actuable by the operator to override a one way clutch for vehicle starting purposes.

The frame of the vehicle further comprises a pair of struts 40 and 42 which are rearward of the front wheel fork 16 and extend downwardly from the lower end of tubular column 12. The terminal ends of struts 40 and 42 are interconnected by a laterally extending pivot shaft 46 on which the forward ends of right and left rearwardly extending trailing arms 48 and 50 are journalled. The trailing arms are thus supported for upward and downward swinging movement on pivot shaft 46 and terminate in hubs 52 and 54 which support the transverse axles 56 and 58 for right and left wheels 60 and 62. While the trailing arms are capable of swinging upwardly and downwardly on pivot shaft 46 in separate planes on opposite sides of the front frame, they are interconnected in such a manner that their turning movements are in equal and opposite direction in cambering operation of the vehicle. To this end the front portions of the trailing arms are interconnected to each other by an equalizer mechanism comprising a bellcrank 66 and a pair of side links 68 and 70. The upper ends of links 68 and 70 are respectively connected to opposite ends of bellcrank 66 by pivots 72 and 74 while their lower ends are respectively pivotally connected to forward portions of trailing arms 48 and 50 by suitable pivots 76 and 78. The equalizer mechanism also supports and determines the inclination or rake angle of the front column 12 and has provision for vehicle parking and fold up storage. The bellcrank 66 is connected by pivot means 80 to a tubular collar 82 which is mounted on an intermediate strut member 84 extending from an upper portion of the column 12 down to a journal for pivot shaft 46. The bellcrank 66, tubular collar 82 and manual levers 86 and 88 supported on the bellcrank and collar form components of a locking and latching mechanism 89 for vehicle parking and for fold up storage purposes. These components and operations are fully described in my copending application Ser. No. 713,411, filed Aug. 11, 1976 for "Cambering Vehicle" whose disclosure is hereby incorporated by reference into this specification. As pointed out in the above-identified copending application, the locking lever 86 is moved from a vehicle operating position to a locking position in which the bellcrank and trailing arms cannot turn so that the vehicle can be parked in a stabilized, upright position. The latching lever 88 is movable to a position in which the collar 82 is allowed to slide on the intermediate strut 84 to permit compact folding of the vehicle for compact storage purposes. In addition to supporting the locking and latching mechanism, the strut 84 supports a generally cylindrical clamping sleeve 100 retained on the strut 84 by threaded fasteners 102 threaded through radial clamping flanges 103 of the sleeve 100. Clamping sleeve 100 has a centralized rearwardly extending web portion 104 which connects to laterally extending cylindrical head 106. The cylindrical head has a pair of retractable pivot pins 108 and 110 mounted therein which are biased outwardly by a centralized spring 112 trapped between the pivot pins. The pivot pins have outwardly extending knobs 114 and 116 which can be manually gripped and squeezed together to slide and retract the pins 108 and 110 to permit the insertion of head 106 between the ears of yoke 122 that forms the forward portion of an intermediate trailing arm 124. As shown, the ears of the yoke have circular holes 126 and 128 that receive the ends of pins 108 and 110 after insertion of the head into a fastening position. The hook 130 rotatably secured to knob 116 is adapted to hook around the pin 114 so that the pivot pin 110 and 108 are held in a retracted position to facilitate insertion into the yoke.

The intermediate trailing arm 124 is swingable in a plane between the planes of the left and right trailing arms and extends rearwardly from its lateral pivotal attachment with the intermediate strut and connects to a tubular upright or post 136. A seat or saddle 140 for supporting the operator 36 is held in adjusted position by clamping sleeve 142. The lower portion of the upright 136 is rigidly attached to the cover 146 of an intermediate rear wheel 148 which is supported on this cover by axle means 150. Intermediate wheel 148 is in alignment with right and left rear wheels 60 and 62 and tracks the front wheel 20 as illustrated in FIGS. 2 and 3.

Figure 2:
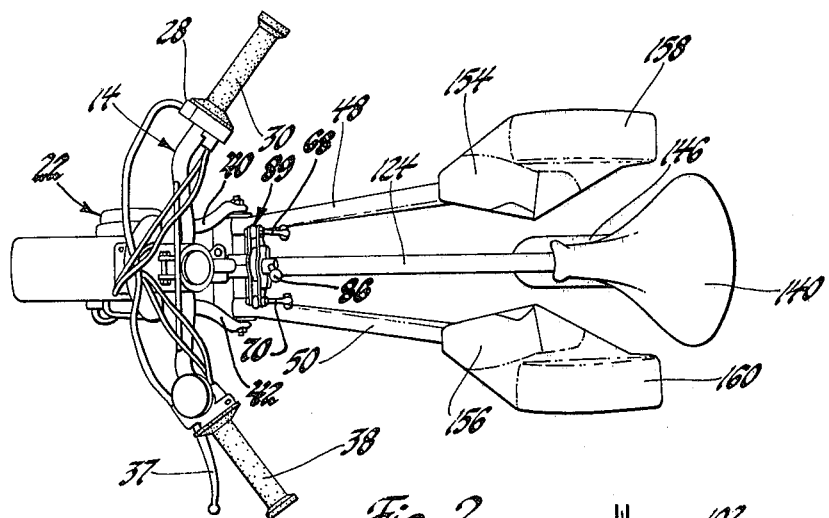
FIG. 2 is a top plan view of the vehicle of FIG. 1.
Figure 4:
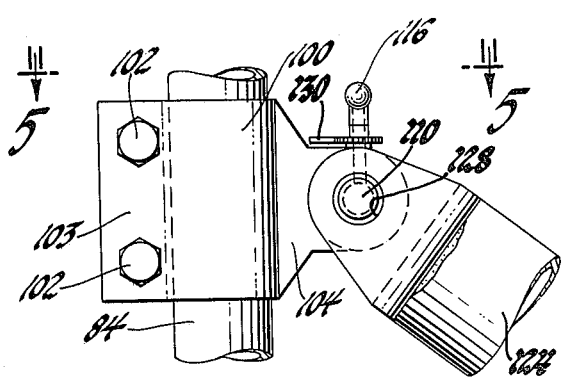
FIG. 4 is a side view of a portion of the vehicle of FIG. 1 illustrating the connection of a trailing arm with vehicle framework.
Figure 3:
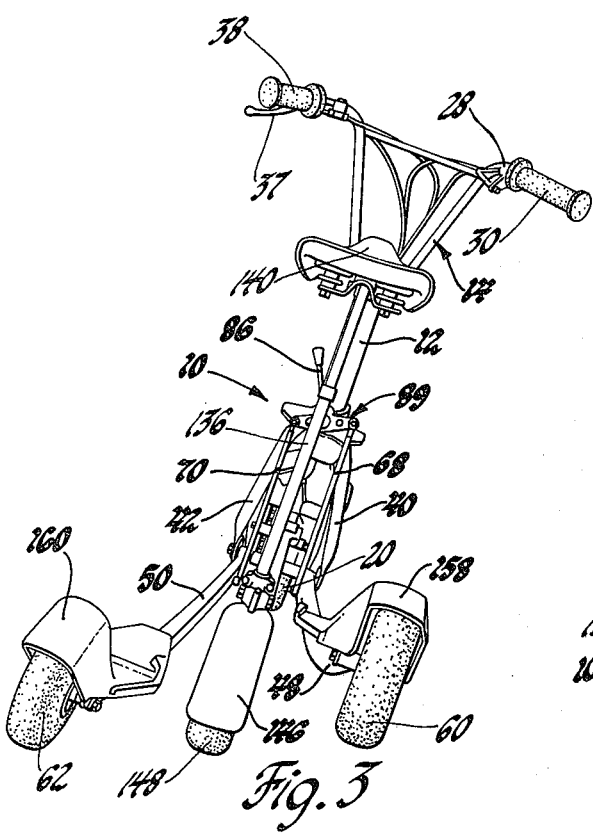
FIG. 3 is an end view of the vehicle of FIGS. 1 and 2.
Figure 5:
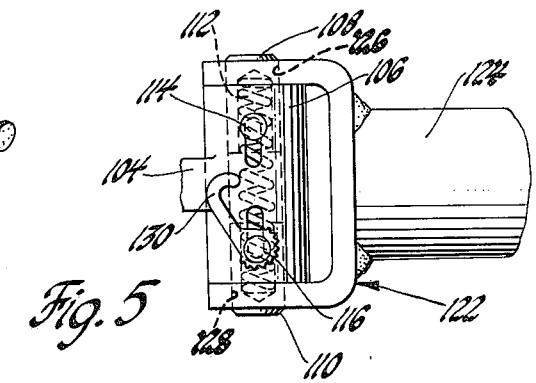
FIG. 5 is a view taken along line 5—5 of FIG. 4.
Figure 6:
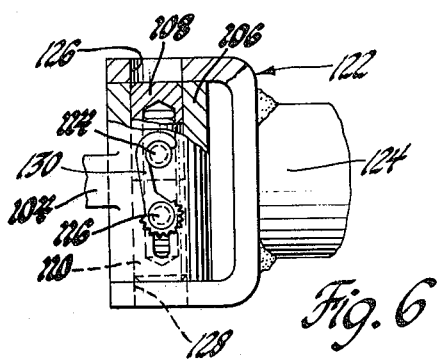
FIG. 6 is a view similar to the view of FIG. 5 showing the vehicle's intermediate arm in an unlatched position.

As best shown in FIG. 2, foot rest means 154 and 156 for the right and left foot of the operator are provided on the wheel covers 158 and 160. Preferably these latter wheel covers are rockable forward and aft on pivots (not illustrated). Suitable braking means, not shown, are engaged directly with the rear wheels 60 and 62 when the vehicle operator rocks rearwardly on his heels to effect vehicle braking. When the vehicle operator rocks forwardly on the foot pads an increased load is placed on the front drive wheel to increase traction of the front drive wheel for increased pulling power. In normal running operation the operator can, while seated on saddle 140, operate the vehicle in upright and in cambering modes of operation. The wheels of the vehicle camber at the same angle as illustrated in FIG. 3 when the vehicle is leaned with improved lateral stability provided by the trailing arms. The ability to sit while on the vehicle reduces fatigue and the physical effort required for vehicle operation, although the higher center of gravity, as compared to stand up operation reduces vehicle stability and controllability.

For cambering right and left turns, the vehicle operator is able to stand on the foot rest means raising off the seat to apply natural loads into the trailing arms so that a highly efficient cambered turn is completed. In the event that the operator desires to reduce overall vehicle weight or simply desires to use the vehicle without the intermediate trailing arm and seat, this component can be readily removed by disengaging the locking pivots from the yoke and removing the intermediate trailing arms from the vehicle assembly. Under such conditions the vehicle would be similar in operation to that disclosed and described in my prior application No. 649,967, filed Jan. 19, 1976, for "Cambering Vehicle".

Figure 7:
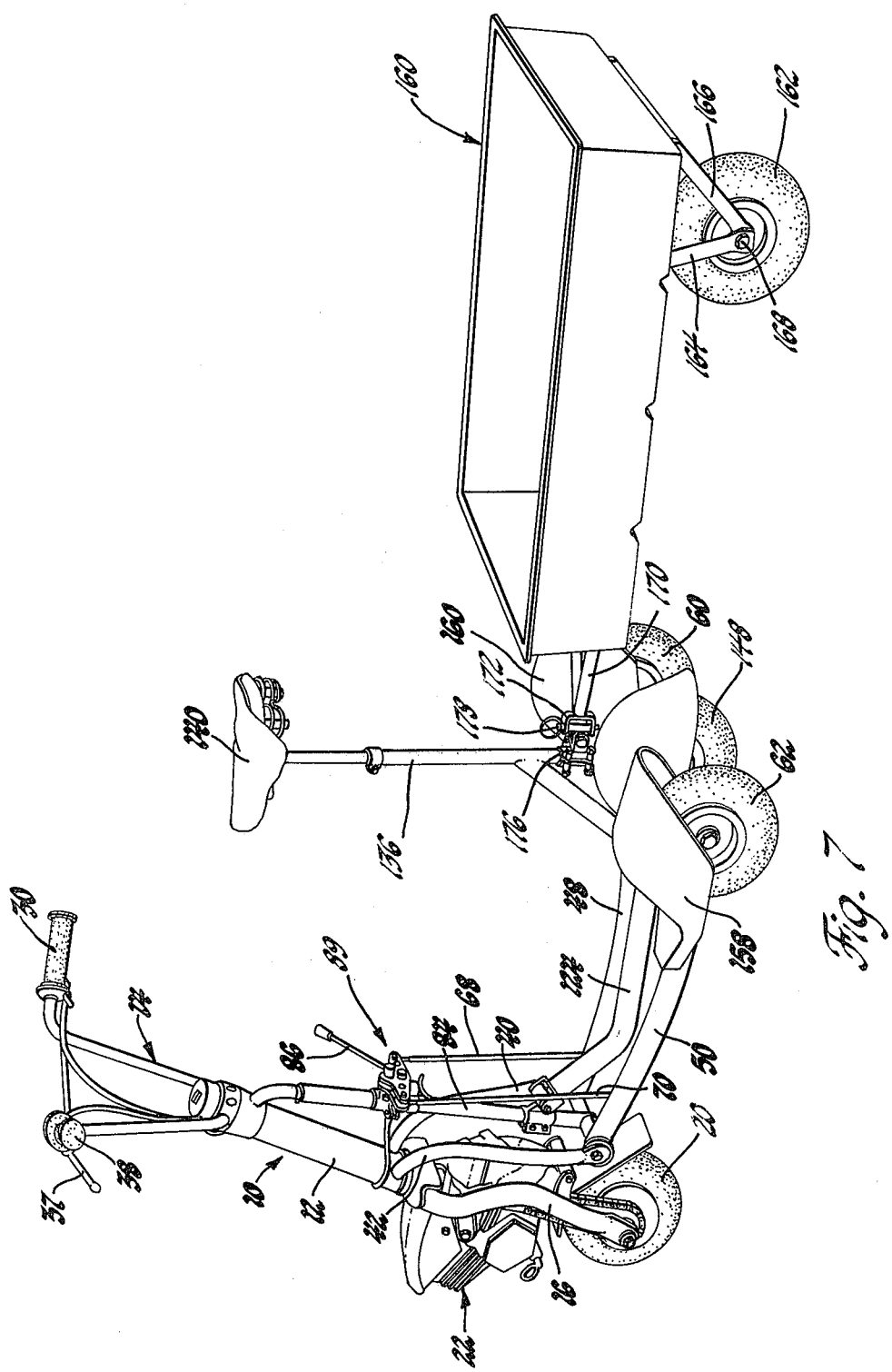
FIG. 7 is a view similar to the view of FIG. 1 showing a trailer attached to the cambering vehicle.

In the event that a greater load capicity is desired for the vehicle, a special trailer can be readily attached to intermediate trailing arm in turn pivoted to the strut 84. The trailer has a rectilinear walled body 160 which is supported by a single wheel 162 aligned with intermediate rear wheel 148 and front wheel 20. As shown, the body 160 has struts 164 and 166 extending from the rear wheel axle 168 into attachment with the base of the trailer. The forward end of the trailer carries a tongue 170 which has a yoke 172 which receives a bracket 176 secured to the upright 136. A vertical pivot pin 178 extends through the yoke to pivotally connect the trailer to the cambering vehicle as shown in FIG. 7. When operating, the vehicle and trailer are cambered by equal amounts and with a high degree of stability and maneuverability.

While a preferred embodiment of this invention has been shown and described, other embodiments will become apparent to those skilled in the art. Accordingly, the limits of this invention are defined in the following claims.

What is claimed is:

1. A cambering vehicle comprising an upright main frame, rotatable and steerable front wheel means, support means pivotally mounting said front wheel means to said main frame, manual steering means operatively connected to said support means to permit said support means and said front wheel means to be manually turned by a vehicle operator to steer said vehicle along a selected course, left and right side trailing arms extending from said main frame, pivot means pivotally connecting the forward end of said left trailing arm on the left side of said main frame and the forward end of said right trailing arm on the right side of said main frame so that said arms swing upwardly and downwardly in separate left and right planes, left and right ground contact wheels supported at the free ends of said left and right trailing arms, left and right foot rest means supported by said left and right arms adjacent the free ends thereof to receive the feet of a vehicle operator so that the vehicle operator can stand upright on the vehicle and shift body weight from one foot to the other while manually gripping said steering means and steering said vehicle along a selected path, a third trailing arm interposed between the left and right trailing arms, attaching means connecting a forward end portion of said third trailing arm to said main frame, ground contact wheel means rotatably supported on the free end of said third trailing arm, a support independent of said frame extending from the free end of said third trailing arm, seat means secured to said support to carry the vehicle operator in a sitting position while the operator rides and operates said vehicle in an upright or cambering mode of operation.

2. A cambering vehicle comprising a main frame, a rotatable and steerable front wheel, support means pivotally mounting said front wheel to said main frame, manual steering means operatively connected to said support means to permit said support means and said front wheel to be manually turned by a vehicle operator to steer said vehicle, left and right side trailing arms extending from said main frame, pivot means pivotally connecting the forward end of said left trailing arm on the left side of said main frame and the forward end of said right trailing arm on the right side of said main frame so that said arms swing in separate left and right planes, left and right ground contact wheels supported at the free ends of said left and right trailing arms, left and right foot rest means supported by said left and right arms respectively adjacent the left and right ground contact wheels to receive the feet of a vehicle operator so that the vehicle operator can stand upright on the vehicle means and manually grip said steering means, a third trailing arm interposed between the left and right trailing arms, pivot means pivotally connecting the forward end of said third trailing arm for movement in a plane between said planes for said left and right trailing arms, a ground contact wheel rotatably supported on the free end portion of said third trailing arms adjacent to the rear wheels carried thereby, operator supporting seat means independent of said main frame operatively connected to said last mentioned contact wheel to permit said operator to operate said vehicle when seated on said seat means.

3. A cambering vehicle comprising an upright main frame, a rotatable and steerable front wheel, support means pivotally mounting said front wheel to said main frame, manual steering means operatively connected to said support means to permit said support means and said front wheel to be manually turned by a vehicle operator to steer said vehicle, left and right side trailing arms extending from said main frame, pivot means pivotally connecting the forward end of said left trailing arm on the left side of said main frame and the forward end of said right trailing arm on the right side of said main frame so that said arms swing upwardly and downwardly in separate left and right planes, left and right ground contact wheels supported at the free ends of said left and right trailing arms, left and right foot rest means supported by said left and right arms adjacent the free ends thereof to receive the feet of a vehicle operator so that the vehicle operator can stand on the foot rest means and manually grip said steering means for guiding said vehicle when riding said vehicle in upright or cambering modes of operation, a third trailing arm interposed between the left and right trailing arms, pivot means pivotally connecting a forward end portion of said third trailing arm to said main frame for upward and downward swinging movement independent of said left and right trailing arms, a ground contact wheel rotatably supported on the free end of said third trailing arm, a support independent of said frame extending upwardly from the free end of said third trailing arm, seat means directly above said last mentioned wheel secured to said support to support the vehicle operator in a sitting position while riding and operating said vehicle in an upright or cambering modes of operation.

4. A cambering vehicle comprising an upright main frame, a rotatable and steerable front wheel, support means pivotally mounting said front wheel to said main frame, manual steering means operatively connected to said support means to permit said support means and said front wheel to be manually turned by a vehicle operator to steer said vehicle, left and right side trailing arms extending from said main frame, pivot means pivotally connecting the forward end of said left trailing arm on the left side of said main frame and the forward end of said right trailing arm on the right side of said main frame so that said arms swing upwardly and downwardly in separate left and right planes, left and right ground contact wheels supported at the free ends of said left and right trailing arms, left and right foot rest means supported by said left and right arms adjacent the free ends thereof to receive the feet of a vehicle operator so that the vehicle operator can stand on the vehicle means and manually grip said steering means for guiding said vehicle when riding said vehicle in upright or cambering modes of operation, a third trailing arm interposed between the left and right trailing arms, pivot means pivotally connecting a forward end portion of said third trailing arm to said main frame for upward and downward swinging movement independent of said left and right trailing arms, a ground contact wheel rotatably on the free end of said third trailing arm laterally aligned with said left and right wheels and tracking said front wheel, a support independent of said frame extending upwardly from the free end of said third trailing arm, seat means secured to said support to support the vehicle operator in a sitting position while the operator rides and operates said vehicle in an upright or cambering manner.

* * * * *